(12) United States Patent
Hayashi et al.

(10) Patent No.: US 9,844,849 B2
(45) Date of Patent: Dec. 19, 2017

(54) MOTOR DRIVEN APPLIANCE

(71) Applicant: MAKITA CORPORATION, Anjo-shi, Aichi (JP)

(72) Inventors: Seitaro Hayashi, Anjo (JP); Goshi Ishikawa, Anjo (JP); Tatsuki Mori, Anjo (JP); Motohiro Omura, Anjo (JP); Tatsuya Yoshizaki, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 450 days.

(21) Appl. No.: 14/597,806

(22) Filed: Jan. 15, 2015

(65) Prior Publication Data

US 2015/0196987 A1    Jul. 16, 2015

(30) Foreign Application Priority Data

Jan. 16, 2014  (JP) ................................ 2014-005930
Jul. 15, 2014  (JP) ................................ 2014-145345

(51) Int. Cl.
*B25F 5/00*       (2006.01)
*B23Q 17/24*      (2006.01)
(Continued)

(52) U.S. Cl.
CPC .......... *B23Q 17/2404* (2013.01); *B25B 23/18* (2013.01); *B25F 5/00* (2013.01);
(Continued)

(58) Field of Classification Search
CPC .... B25F 5/02; B25F 5/021; B25F 5/00; B25B 21/00; B25B 23/151; B25B 23/18;
(Continued)

(56) References Cited

U.S. PATENT DOCUMENTS 2,310,166 A * 2/1943 Way ........................ B25F 5/021
                                                        310/50
5,357,179 A * 10/1994 Abbagnaro ............. B23B 45/02
                                                         318/17
(Continued)

FOREIGN PATENT DOCUMENTS

CN         101284374 A      10/2008
CN         101590640 A      12/2009
(Continued)

OTHER PUBLICATIONS

Dec. 24, 2015 Office Action issued in Chinese Patent Applicaton No. 201510023210.7.
(Continued)

*Primary Examiner* — Scott A. Smith
(74) *Attorney, Agent, or Firm* — Oliff PLC

(57) ABSTRACT

A motor driven appliance in one aspect of embodiments of the present disclosure comprises a light source, a lighting unit, a motor, an operation unit, an operation detector, a reference signal output unit, a determination unit, and a control unit. The operation detector detects that the operation unit is operated, and outputs an operation detection signal that indicates that the operation unit is operated. The reference signal output unit outputs at least one reference signal that can be used as a reference for determining whether the detection by the operation detector is normal. The determination unit determines whether the operation unit is actually operated based on the operation detection signal and the at least one reference signal. The control unit controls operation of the lighting unit based on the determination made by the determination unit.

11 Claims, 11 Drawing Sheets

(51) Int. Cl.
   *B25B 23/18*   (2006.01)
   *B25F 5/02*    (2006.01)
   *B25B 23/12*   (2006.01)
   *B25B 21/00*   (2006.01)
   *H01H 9/06*    (2006.01)

(52) U.S. Cl.
   CPC ............ *B25F 5/021* (2013.01); *B25B 21/00* (2013.01); *B25B 23/12* (2013.01); *H01H 9/06* (2013.01)

(58) Field of Classification Search
   CPC ....... B25B 23/00; B25B 23/12; B25D 11/005; B25D 11/10; H01H 9/02; H01H 9/06; H02K 7/14; H02K 7/145
   USPC .... 173/2, 20, 104, 109, 46, 162.1, 217, 170, 173/47, 162.2; 310/47, 50, 140, 73, 184; 362/109, 119, 89, 120, 192, 190, 394; 318/3, 472, 473, 17, 139, 375, 400.18
   See application file for complete search history.

(56) References Cited

U.S. PATENT DOCUMENTS

| | | | | |
|---|---|---|---|---|
| 5,406,441 | A * | 4/1995 | Warda | B25C 1/008 227/7 |
| 6,206,538 | B1 * | 3/2001 | Lemoine | B25B 23/18 307/132 R |
| 6,318,874 | B1 * | 11/2001 | Matsunaga | B25F 5/021 315/360 |
| 6,785,996 | B2 * | 9/2004 | Danner | F41A 17/08 42/70.01 |
| 7,185,998 | B2 * | 3/2007 | Oomori | B25B 23/18 362/119 |
| 7,854,360 | B2 * | 12/2010 | Suda | B25C 1/008 227/10 |
| 7,866,307 | B2 * | 1/2011 | Monks | F41A 19/69 124/32 |
| 7,893,586 | B2 * | 2/2011 | West | H02K 23/36 310/140 |
| 8,191,648 | B2 * | 6/2012 | Watanabe | B25D 11/10 173/104 |
| 8,317,350 | B2 * | 11/2012 | Friedman | B25B 21/00 362/119 |
| 8,347,978 | B2 * | 1/2013 | Forster | B25C 1/06 173/1 |
| 8,382,308 | B2 * | 2/2013 | Hecht | B25B 21/00 362/109 |
| 8,616,300 | B2 * | 12/2013 | Suzuki | B25F 5/021 173/2 |
| 8,981,680 | B2 * | 3/2015 | Suda | B25F 5/00 315/314 |
| 2003/0127932 | A1 * | 7/2003 | Ishida | B25F 5/00 310/184 |
| 2005/0157489 | A1 * | 7/2005 | Oomori | B25B 23/18 362/119 |
| 2008/0105243 | A1 | 5/2008 | Monks | |
| 2008/0251558 | A1 | 10/2008 | Suda | |
| 2009/0295313 | A1 | 12/2009 | Suzuki et al. | |
| 2009/0309519 | A1 | 12/2009 | Suzuki et al. | |
| 2010/0117581 | A1 * | 5/2010 | Miwa | H02P 29/66 318/472 |
| 2010/0236800 | A1 | 9/2010 | Watanabe et al. | |
| 2010/0236801 | A1 * | 9/2010 | Furusawa | B25D 11/10 173/47 |
| 2011/0114347 | A1 * | 5/2011 | Kasuya | B25D 11/005 173/11 |
| 2013/0076271 | A1 | 3/2013 | Suda et al. | |

FOREIGN PATENT DOCUMENTS

| | | |
|---|---|---|
| CN | 101607396 A | 12/2009 |
| CN | 101844346 A | 9/2010 |
| CN | 103009350 A | 4/2013 |
| EP | 1 980 367 A2 | 10/2008 |
| EP | 2 572 834 A1 | 3/2013 |
| JP | H10-34564 A | 2/1998 |
| JP | 2008-260100 A | 10/2008 |
| JP | 2009-297854 A | 12/2009 |
| WO | 2011/096363 A1 | 8/2011 |
| WO | 2013/122267 A1 | 8/2013 |

OTHER PUBLICATIONS

Jun. 19, 2015 extended Search Report issued in European Patent Application No. 15151164.9.
Oct. 24, 2017 Office Action issued in Japanese Patent Application No. 2014-145345.

* cited by examiner

FIG. 6
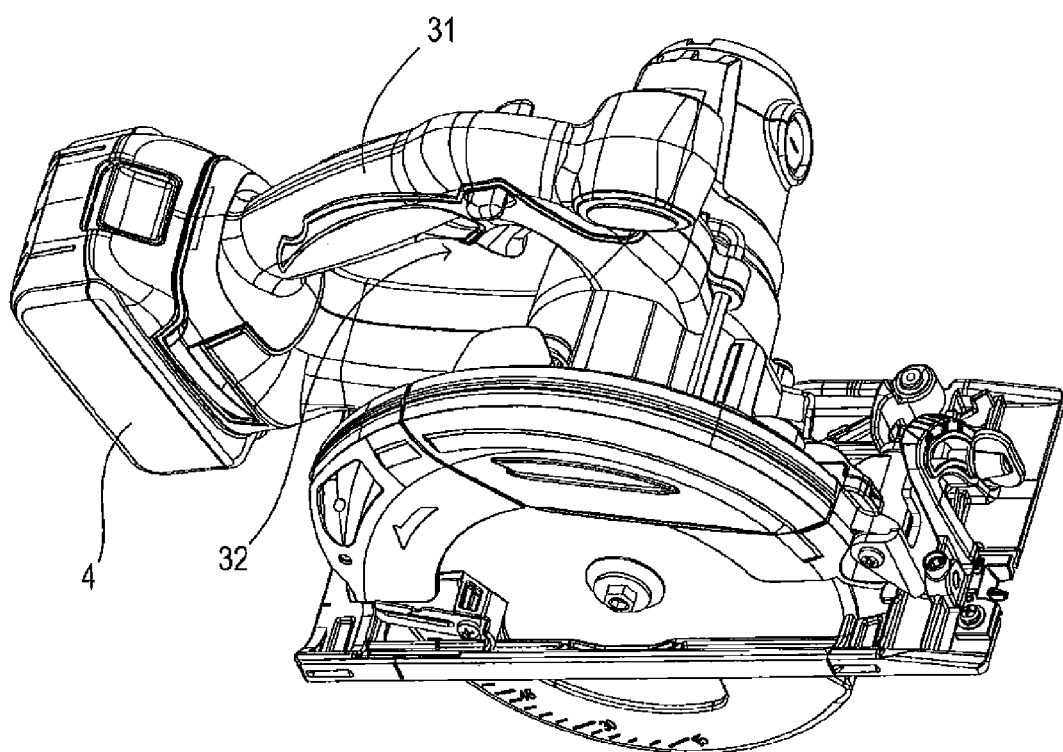
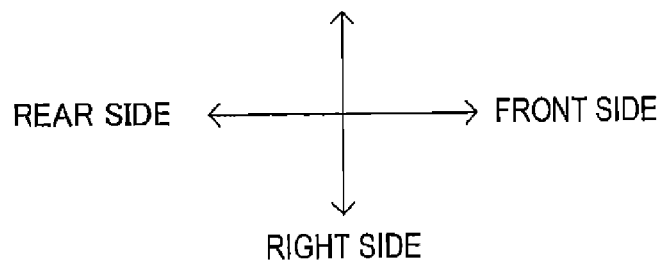

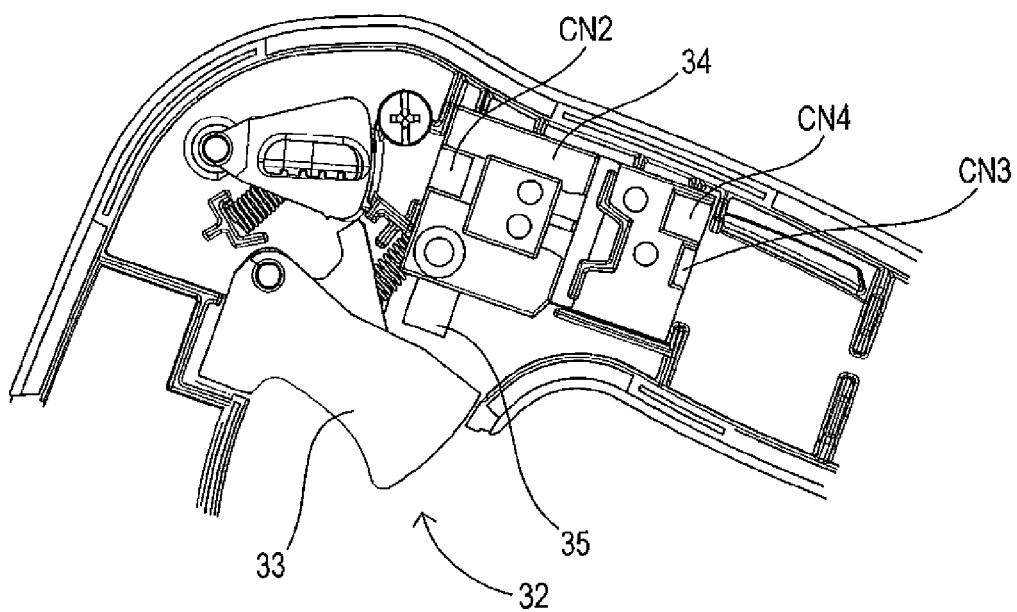

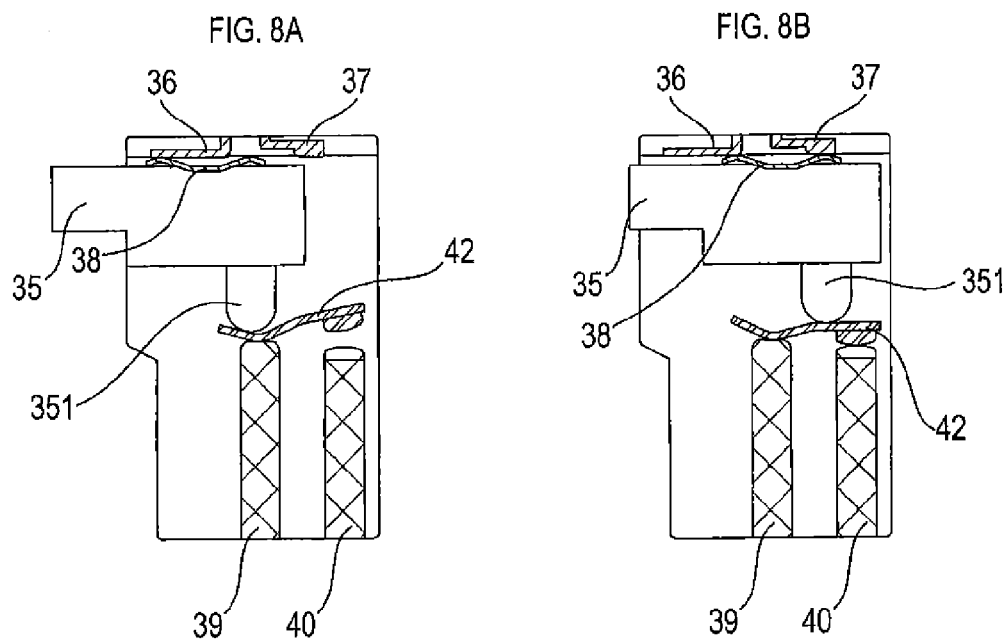

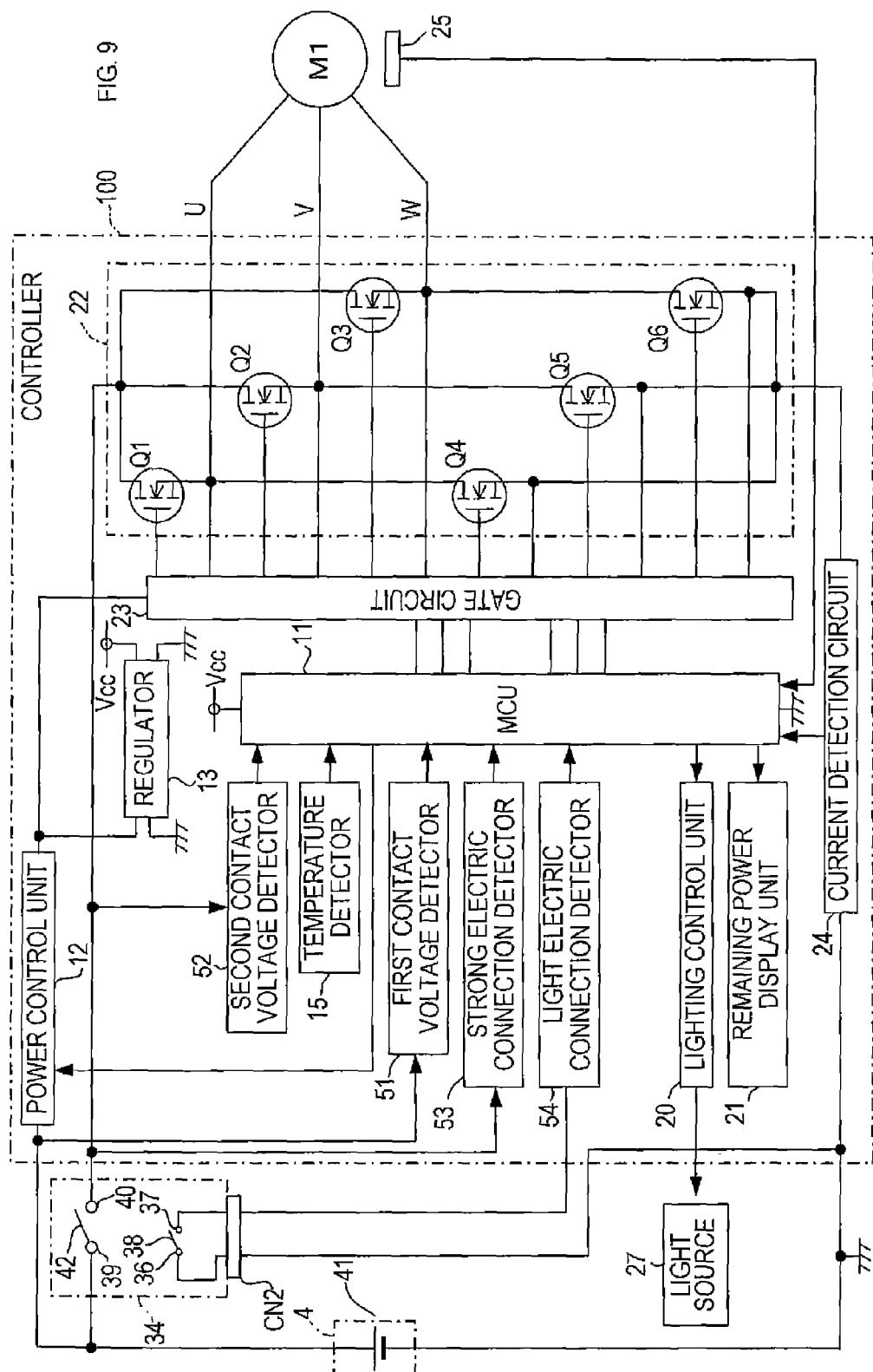

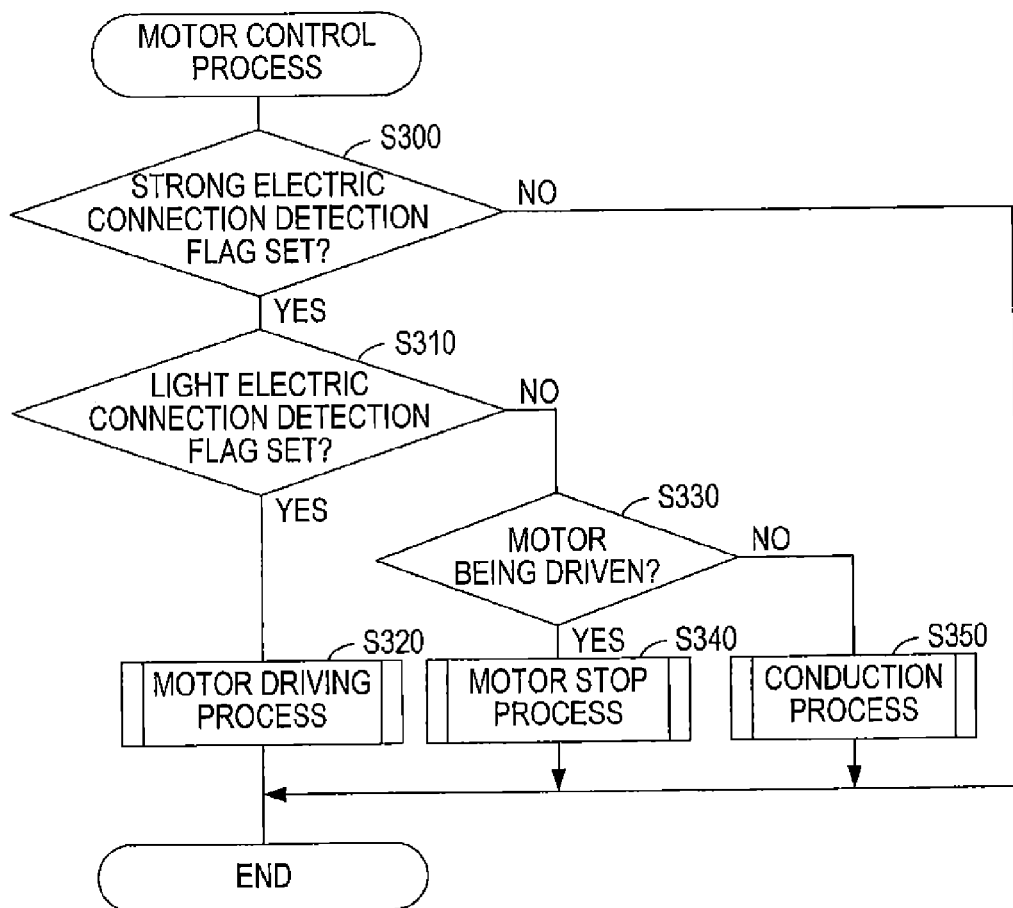

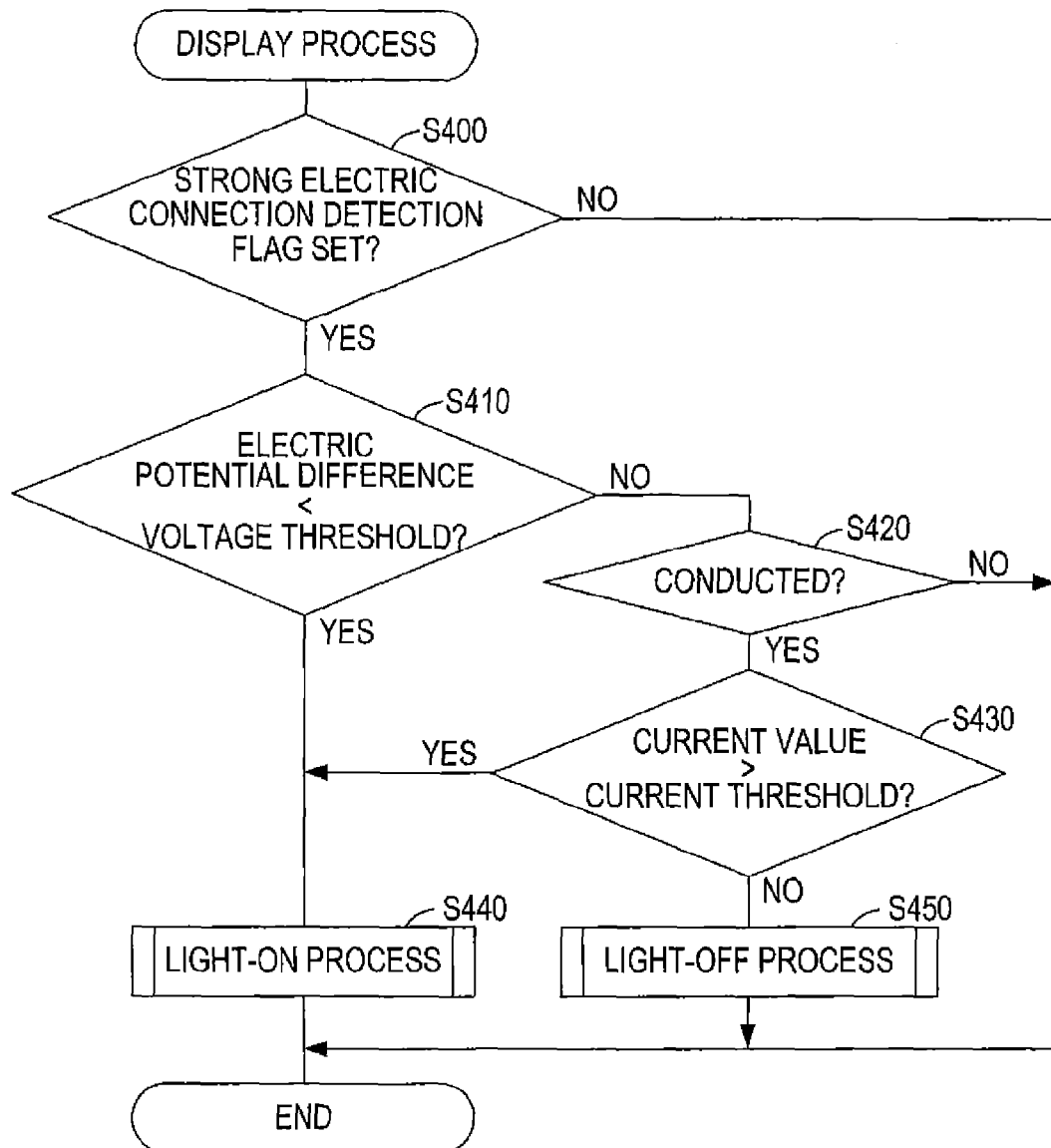

MOTOR DRIVEN APPLIANCE

CROSS-REFERENCE TO RELATED APPLICATIONS

This application claims the benefit of Japanese Patent Applications No. 2014-005930 filed Jan. 16, 2014 and No. 2014-145345 filed Jul. 15, 2014 in the Japan Patent Office, and the entire disclosures of which are incorporated herein by reference.

BACKGROUND

The present disclosure relates to a motor driven appliance provided with a light source.

An example of an electric power tool disclosed in Japanese Unexamined Patent Application Publication No. 2009-297854 is configured to turn on a lighting LED by an electric power supplied from a battery when a trigger switch is operated.

More specifically, an electronic circuit of the electric power tool, as shown in FIG. 2 of the above referenced publication, is configured such that a detection signal that indicates that the trigger switch has been operated is input from a detection circuit of the trigger switch to a microcomputer. The microcomputer is configured to turn on the lighting LED when the detection signal is input.

SUMMARY

In a typical electric power tool, since a relatively high voltage is applied to a current path from a battery to a motor, electronic components such as switch contacts and connector terminals provided on the current path are well spaced in order to suppress short circuits between those electronic components. On the other hand, a voltage applied to a microcomputer and its peripheral circuits is relatively low. In order to promote miniaturization of the electric power tool, electronic components constituting the microcomputer and its peripheral circuits are arranged close to each other. Between the electronic components closely arranged in this way, a short circuit may be caused by water or dust entered into the electric power tool. For example, when a short circuit occurs between a detection circuit of a trigger switch and the microcomputer as a result that moisture or dust enters and adheres between the electronic components that constitute the detection circuit and the microcomputer, it is possible that a detection signal is input from the detection circuit to the microcomputer although the trigger switch is not actually operated. When a detection signal is input to the microcomputer as such, the microcomputer may incorrectly recognize that the trigger switch is operated and turns on the lighting LED, thereby to wastefully consume electric power of the battery.

In one aspect of embodiments of the present disclosure, it is preferable that a motor driven appliance can be provided that can suppress unnecessary lighting of a light source due to erroneous recognition by the motor driven appliance that the motor driven appliance is operated.

A motor driven appliance in one aspect of embodiments of the present disclosure comprises a light source, a lighting unit, a motor, an operation unit, an operation detector, a reference signal output unit, a determination unit, and a control unit. The lighting unit is configured to turn on the light source. The motor is configured to generate a driving force for work to be done by a user of the motor driven appliance. The operation unit is configured to be operated by the user to actuate the motor. The operation detector is configured to detect that the operation unit is operated, and outputs an operation detection signal that indicates that the operation unit is operated. The reference signal output unit is configured to output at least one reference signal that can be used as a reference for determining whether the detection by the operation detector is normal. The determination unit is configured to determine whether the operation unit is actually operated based on the operation detection signal and the at least one reference signal. The control unit is configured to control operation of the lighting unit based on the determination made by the determination unit.

In the motor driven appliance thus constructed, since whether the operation unit is actually operated is determined based on not only the operation detection signal but also the at least one reference signal, it is possible to determine more precisely whether the operation unit is actually operated. Therefore, erroneous recognition that the motor driven appliance is operated can be suppressed, and thus unnecessary lighting of the light source can be suppressed.

The control unit may control the operation of the lighting unit in any way as long as being able to suppress unnecessary lighting of the light source by the lighting unit. The control unit may be configured, for example, to stop the operation of the lighting unit when the determination unit determines that the operation unit is not actually operated, while to actuate the lighting unit when the determination unit determines that the operation unit is actually operated.

The motor driven appliance may further comprise a power source configured to supply to the motor an electric power to drive the motor. The operation unit may be provided with a switch configured to electrically connect and disconnect the motor and the power source. In this case, the reference signal output unit may be configured to output as the at least one reference signal a signal that indicates whether the motor and the power source are electrically connected via the switch.

Since usually a relatively high voltage is applied onto a current path from the power source to the motor, contacts of the switch are spaced apart so that it is difficult for a short circuit to occur. It is hard for moisture or dust to adhere between the contacts of the switch. That is, if the motor and the power source are electrically connected via the switch, it is highly possible that the operation unit is actually operated.

Therefore, in the motor driven appliance configured as such, it is possible to suppress erroneous recognition that the motor driven appliance is operated based on whether the motor and the power source are electrically connected, and thus to suppress unnecessary lighting of the light source.

The motor driven appliance may further comprise a substrate without waterproof and dustproof coatings. In this case, the reference signal output unit may be configured to output as the at least one reference signal a signal that indicates whether a short circuit is occurring in the substrate.

In the motor driven appliance thus constructed, if moisture or dust adheres to a surface of the substrate, it is possible that moisture or dust may adhere also to the operation unit. Thus, in the motor driven appliance constructed in this way, it is possible to suppress erroneous recognition that the motor driven appliance is operated based on whether a short circuit is occurring in the substrate, and thus to suppress unnecessary lighting of the light source.

The operation detector may include at least one first terminal for outputting an operation detection signal, and at least two second terminals distinct from the at least one first terminal. In this case, the reference signal output unit may be configured to output as the at least one reference signal a signal that indicates whether a short circuit is occurring between the at least two second terminals.

In the motor driven appliance thus constructed, when the operation detection signal is set to have a relatively low voltage, the aforementioned at least one first terminal and at least two second terminals may be disposed close to each other and moisture or dust may adhere between these terminals. Therefore, in the motor driven appliance configured in this way, it is possible to suppress erroneous recognition that the motor driven appliance is operated based on whether a short circuit is occurring between the at least two second terminals, and thus to suppress unnecessary lighting of the light source.

The operation unit may be configured to include a first contact connected to a power source configured to supply to the motor an electric power to drive the motor, and a second contact connected to the motor, and may be configured to electrically connect the first contact and the second contact to each other when the operation unit is operated. In this case, the reference signal output unit may be configured to output as the at least one reference signal at least one signal that indicates at least one kind of physical quantity related to an impedance between the first contact and the second contact.

In the motor driven appliance thus constructed, it is possible to suppress erroneous recognition that the motor driven appliance is operated based on the at least one kind of physical quantity related to the impedance between the first contact and the second contact, thus to suppress unnecessary lighting of the light source.

In this case, the determination unit may be configured to determine that the operation unit is not actually operated if the at least one signal that indicates the at least one kind of physical quantity indicates that the impedance between the first contact and the second contact is greater than a predetermined specified impedance.

If the operation unit is not actually operated, the first contact and the second contact are electrically disconnected. Thus, the impedance between the first contact and the second contact is greater than the impedance at the time when the operation unit is actually operated and the first contact and the second contact are electrically connected.

Therefore, in the motor driven appliance configured as described above, for example, an impedance greater than the impedance at the time when the first contact and the second contact are electrically connected may be set as the specified impedance.

The at least one kind of physical quantity may include a physical quantity of any kind related to the impedance between the first contact and the second contact.

For example, the at least one kind of physical quantity may include an electric potential difference between the first contact and the second contact. In this case, it is possible to suppress erroneous recognition that the motor driven appliance is operated based on the electric potential difference between the first contact and the second contact, and thus to suppress unnecessary lighting of the light source.

In addition, the at least one kind of physical quantity may include a magnitude of a current flowing through the motor. In this case, it is possible to suppress erroneous recognition that the motor driven appliance is operated based on the magnitude of a current flowing through the motor, and thus to suppress unnecessary lighting of the light source.

If the at least one kind of physical quantity includes the magnitude of a current flowing through the motor, the motor driven appliance may further comprise a switching unit configured to electrically connect and disconnect the second contact and the motor, and a driving unit configured to drive the switching unit so as to electrically connect the second contact and the motor, the driving unit driving the switching unit to flow a current of a predetermined magnitude to the motor to confirm whether the operation unit is actually operated.

In this case, for example, by configuring the driving unit to drive the switching unit to flow to the motor a minimum current required to confirm whether the impedance between the first contact and the second contact is greater than the specified impedance, it is possible to reduce or eliminate a possibility of danger of unnecessary rotation of the motor.

BRIEF DESCRIPTION OF THE DRAWINGS

Exemplified embodiments of the present disclosure will be described below by way of example with reference to the accompanying drawings in which:

FIG. 6 is a perspective view of a motor driven appliance of a third embodiment;

FIG. 7 is an enlarged cross-sectional view of a switch unit in the motor driven appliance of the third embodiment;

FIGS. 8A and 8B are schematic cross-sectional views of a switch unit of the third embodiment, showing operation of the switch unit;

FIG. 9 is a circuit diagram of an electric system in the motor driven appliance of the third embodiment;

FIG. 10 is a flowchart showing a flow of a motor control process of the third embodiment; and FIG. 11 is a flowchart showing a flow of a display process of the third embodiment.

DETAILED DESCRIPTION OF THE PREFERRED EMBODIMENTS

First Embodiment

Figure 1:
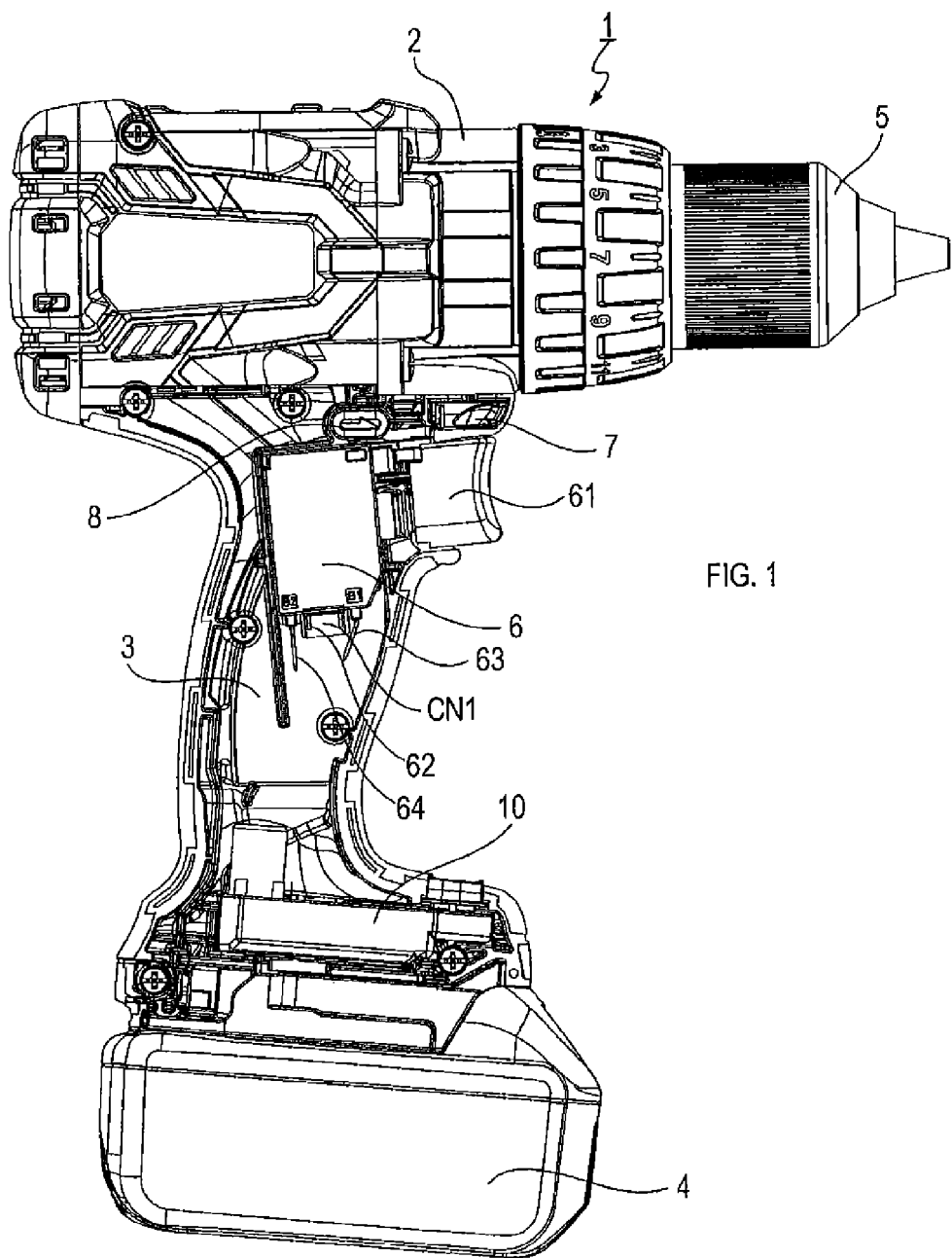
FIG. 1 is a plan view of a motor driven appliance in a first embodiment.

As shown in FIG. 1, a motor driven appliance in a first embodiment (hereinafter, referred to as "appliance") 1 is configured as an electric power tool. More specifically, the appliance 1 is configured as a rechargeable driver drill, and comprises a main body 2, a handle portion 3, and a battery pack 4.

The main body 2 accommodates a later described motor M1 (see FIG. 2) at the rear part thereof (left side in the figure), and a not shown driving force transmission mechanism or the like at the front part thereof (right side in the figure). A sleeve 5 for receiving a not shown tool bit (for example, a driver bit, etc.) rotatably protrudes at the front end of the main body 2. A rotational driving force of the motor M1 is transmitted to the sleeve 5 via the driving force transmission mechanism or the like.

The handle portion 3 extends downward of the main body 2. The battery pack 4 is detachably attached at a lower end of the handle portion 3. In FIG. 1, one side surface of the handle portion 3 is removed, for the purpose of illustration, so that an interior of the handle portion 3 can be seen.

A switch section 6 is provided on top of the handle portion 3 for a user of the appliance 1 to operate the rotation of the motor M1. In the switch section 6, a trigger switch 61 is provided that can be operated while the user holds the handle portion 3. At the lower end of the switch section 6, a connector CN1 is provided that has a plurality of terminals 62. In addition, at the lower end of the switch section 6, a pair of terminals 63 and 64 are arranged on opposite sides of the connector CN1.

A lighting unit 7 and a rotation direction change switch 8 are provided above the switch section 6. The lighting unit 7 is configured to radiate light to the front of the appliance 1, that is, a work area of the user. The rotation direction change switch 8 is a switch for the user to selectively change the direction of rotation of the motor M1 to one of a forward direction and a reverse direction.

Also, inside the lower end of the handle portion 3, a controller 10 is accommodated that is operated by an electric power supplied from the battery pack 4 and controls each part of the appliance 1.

Figure 2:
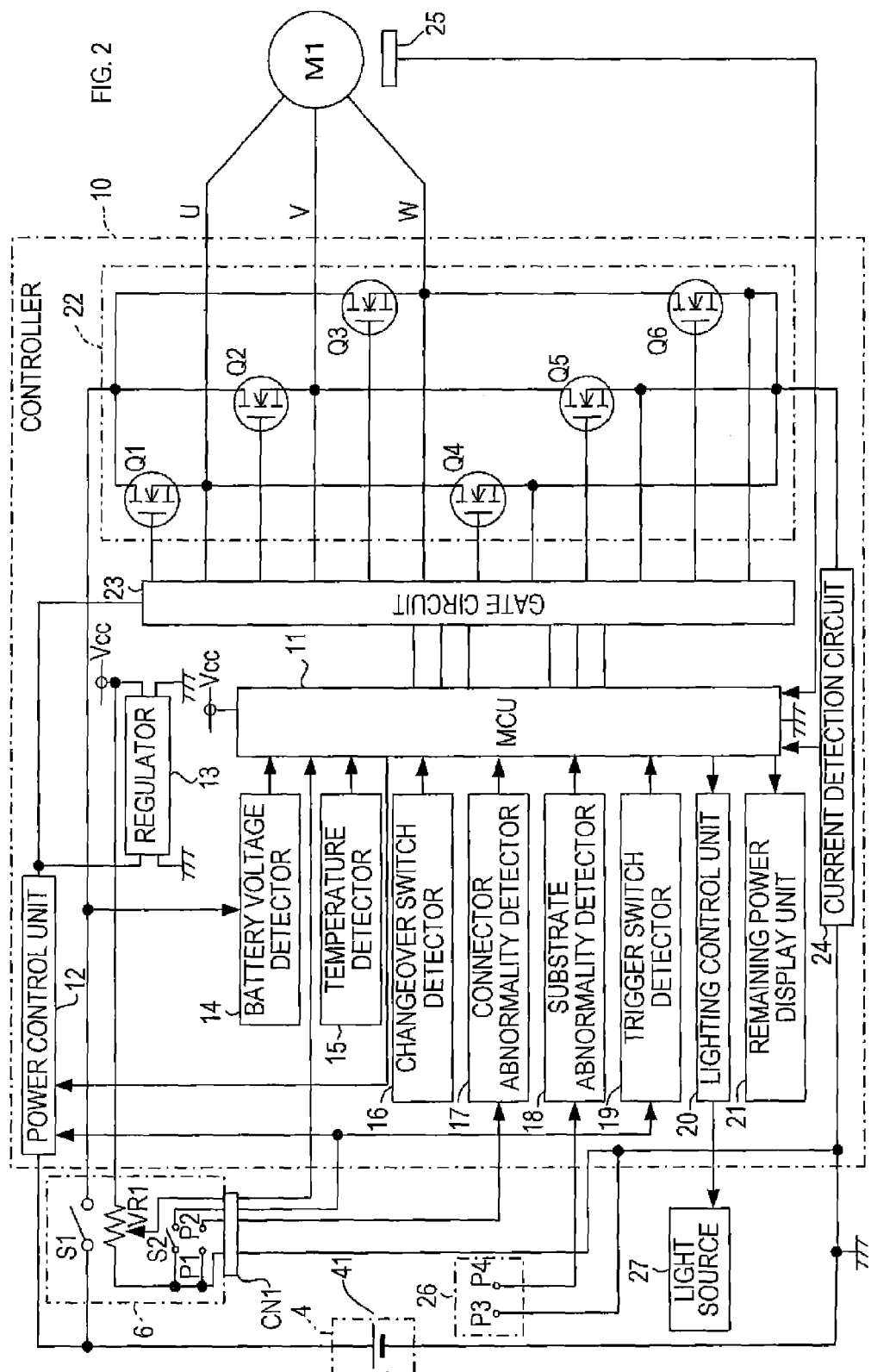
FIG. 2 is a circuit diagram of an electric system in the motor driven appliance of the first embodiment.

An electrical system as shown in FIG. 2 is constructed inside the appliance 1.

As shown in FIG. 2, the battery pack 4 comprises a built-in battery 41. The battery 41 comprises a plurality of not shown rechargeable battery cells that are connected in series, and is configured to output a battery voltage having a predetermined direct current (DC) voltage (for example, 14.4 VDC).

The switch section 6 comprises a switch S1, a variable resistor VR1, a switch S2, and a pair of dummy pads P1, P2.

The switch S1 is configured to work with the trigger switch 61. More specifically, the switch S1 is configured to be turned on when the trigger switch 61 is operated, and turned off when the operation of the trigger switch 61 is released. The switch S1 is provided with a pair of contacts, one of the contacts is connected to a positive electrode of the battery 41 via the terminal 64 described above, and the other of the contacts is connected to the controller 10 via the terminal 63 described above.

One end of the variable resistor VR1 is connected to the controller 10, and the other end of the variable resistor VR1 is connected to a negative electrode of the battery 41 through one of the plurality of terminals 62 of the connector CN1. A movable terminal of the variable resistor VR1 is configured to be displaced in accordance with the operation amount of the trigger switch 61, and is connected to the controller 10 via another one of the plurality of terminals 62 of the connector CN1.

The switch 82, like the switch S1, is configured to work with the trigger switch 61. That is, the switch S2 is configured to be turned on when the trigger switch 61 is operated, and turned off when the operation of the trigger switch 61 is released. The switch S2 is provided with a pair of contacts, one of the contacts is connected to the controller 10 via another one of the plurality of terminals 62 of the connector CN1, and the other of the contacts is connected to the other end of the variable resistor VR1.

The pair of dummy pads P1, P2 are provided in close proximity to each other. The dummy pad P1 is connected to the other end of the variable resistor VR1. The dummy pad P2 is connected to the controller 10 via another one of the plurality of terminals 62 of the connector CN1.

The controller 10 comprises a main control unit (MCU) 11. The MCU 11 is, in the first embodiment, configured as a well-known microcomputer including at least a CPU, a memory, an I/O, an A/D converter and so on.

The controller 10 comprises a power control unit 12. The power control unit 12 is connected to one contact of the switch S2 in the switch section 6. The power control unit 12 is configured to operate when the trigger switch 61 described above is operated and the switch S2 is turned on, and, until receiving a stop command from the MCU 11, continue to output the battery voltage supplied from the battery 41 from the power control unit 12.

The controller 10 is provided with a regulator 13. The regulator 13 is configured to step down the battery voltage output from the power control unit 12 to generate a control voltage Vcc that is a predetermined voltage (e.g., 5 VDC), and supply the generated control voltage Vcc to the various circuits in the controller 10, including the MCU 11. In addition, the regulator 13 applies the control voltage Vcc to one end of the variable resistor VR1.

The controller 10 comprises a battery voltage detector 14. The battery voltage detector 14 is connected to the other contact of the switch S1 in the switch section 6. The battery voltage detector 14 is configured to detect a value of the battery voltage through the switch S1, and output to the MCU 11 a battery voltage detection signal that indicates the value of the detected battery voltage.

The controller 10 comprises a temperature detector 15. The temperature detector 15 is configured to detect the temperature of the controller 10 and output to the MCU 11 a temperature detection signal that indicates the detected temperature.

The controller 10 is provided with a changeover switch detector 16. The changeover switch detector 16 is configured to detect that the rotation direction changeover switch 8 described above is operated, and output to the MCU 11 a changeover detection signal that indicates that the rotation direction changeover switch 8 has been operated.

The controller 10 comprises a connector abnormality detector 17. The connector abnormality detector 17 is connected to the dummy pad P2 described above. The connector abnormality detector 17 is configured to detect whether the dummy pad P2 and the dummy pad P1 are short circuited based on whether the voltage of the dummy pad P2 matches the voltage of the negative electrode of the battery 41, and output to the MCU 11 a first short-circuit detection signal that indicates whether a short circuit has occurred.

The controller 10 also comprises a substrate abnormality detector 18. The substrate abnormality detector 18 is configured to detect whether a short circuit has occurred in a dummy substrate 26 provided in the vicinity of the switch section 6. More specifically, the dummy substrate 26 is a substrate without waterproof and dustproof coatings. On the dummy substrate 26, a pair of dummy pads P3, P4 are provided. The dummy pad P3 is connected to the negative electrode of the battery 41. The dummy pad P4 is connected to the substrate abnormality detector 18. The substrate abnormality detector 18 is configured to detect whether the dummy pad P4 and the dummy pad P3 are short circuited based on whether the voltage of the dummy pad P4 matches the voltage of the negative electrode of the battery 41, and output to the MCU 11 a second short-circuit detection signal that indicates whether a short-circuit has occurred.

The controller 10 also comprises a trigger switch detector 19. The trigger switch detector 19 is connected to one contact of the switch S2 in the switch section 6. The trigger switch detector 19 is configured to output to the MCU 11 an operation detection signal that indicates that the trigger switch 61 is operated when the switch S2 is turned on and the voltage of the one contact of the switch S2 matches the voltage of the negative electrode of the battery 41.

The controller 10 also comprises a lighting control unit 20. The lighting control unit 20 is configured to turn on or off the light source 27 of the lighting unit 7 described above according to a light-on command or light-off command from the MCU 11. In the first embodiment, the light source 27 comprises at least one LED.

The controller 10 also comprises a remaining power display unit 21. The remaining power display unit 21 is configured to display the remaining power of the battery 41 in accordance with a display command from the MCU 11. More specifically, the MCU 11 calculates the remaining power of the battery 41 based on the aforementioned battery voltage detection signal input from the battery voltage detector 14, and outputs the display command based on the calculated remaining power to the remaining power display unit 21. The remaining power display unit 21 comprises a plurality of not shown light sources such as LEDs, and is configured to display the remaining power of the battery 41 by lighting a number of the LEDs corresponding to the display command.

The controller 10 also comprises a driver circuit 22 for driving the motor M1. In the first embodiment, the motor M1 is configured as a three-phase brushless DC motor. Therefore, the driver circuit 22 of the first embodiment comprises six switching elements Q1 to Q6. Terminals U, V and W in the motor M1 are connected to the switch S1 and the negative electrode of the battery 41 via the switching elements Q1 to Q6. The terminals U, V and W are respectively connected to one of not shown three coils provided in the motor M1 to rotate a not shown rotor of the motor M1.

The controller 10 also comprises a gate circuit 23. The gate circuit 23 is configured to be supplied with the battery voltage via the power control unit 12 and turn on/off each of the switching elements Q1 to Q6 in the gate circuit 23 based on a drive command from the MCU 11.

The controller 10 comprises a current detection circuit 24. The current detection circuit 24 is configured to detect a value of a current flowing from the motor M1 to the negative electrode of the battery 41 via the driver circuit 22 and output to the MCU 11 a current detection signal that indicates the detected value of the current.

In addition, the controller 10 comprises a rotational position detector 25. The rotational position detector 25 is configured to output to the MCU 11 a signal that indicates that the rotor of the motor M1 has rotated a predetermined angle each time a rotational position of the rotor of the motor M1 reaches a predetermined rotation position (i.e., each time the motor M1 rotates a predetermined amount).

Figure 3:
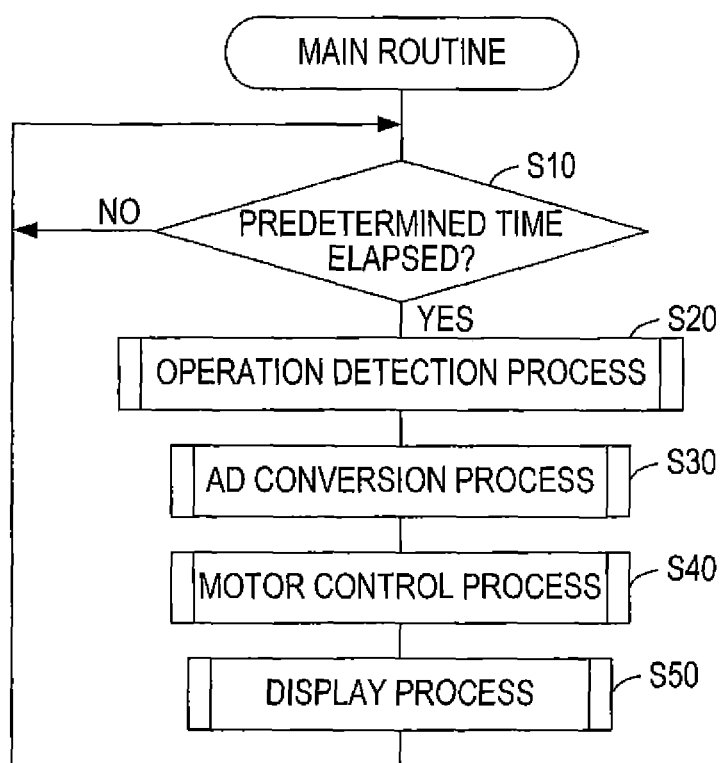
FIG. 3 is a flowchart showing a flow of a main routine executed by a main control unit of the motor driven appliance of the first embodiment.

In the controller 10 configured as described above, the MCU 11 controls the operation of the appliance 1 by executing a main routine shown in FIG. 3. The MCU 11 initiates the main routine when activated with an electric power supplied from the regulator 13.

As shown in FIG. 3, in the main routine, it is first determined whether a predetermined time has elapsed (S10). If the predetermined time has not yet elapsed (S10: NO), the process of S10 is repeated until the predetermined time elapses. When the predetermined time has elapsed (S10: YES), an operation detection process is executed (S20). In the operation detection process, it is determined whether the operation detection signal is input from the trigger switch detector 19. When the operation detection signal is input, an operation detection flag indicating that the trigger switch 61 is operated is set. When the operation detection signal is not input, the operation detection flag is reset.

When the operation detection process is completed, an AD conversion process is executed (S30). In the AD conversion process, a voltage value input from the movable terminal of the variable resistor VR1 described above, the value of the battery voltage indicated by the battery voltage detection signal, the value of the temperature indicated by the temperature detection signal, a value of the voltage of the first short-circuit detection signal, a value of the voltage of the second short-circuit detection signal, and the value of the current indicated by the current detection signal, are converted into digital values and stored in the memory of the MCU 11.

When the AD conversion process is completed, a motor control process is executed (S40). In the motor control process, a drive command in accordance with the operation detection flag, the voltage value input from the movable terminal, etc. is output to the gate circuit 23 to control the drive of the motor M1.

After completion of the motor control process, a display process described later is executed (S50). Thereafter, the process goes to S10 again, and the processes of S10 to S50 are repeatedly executed.

Figure 4:
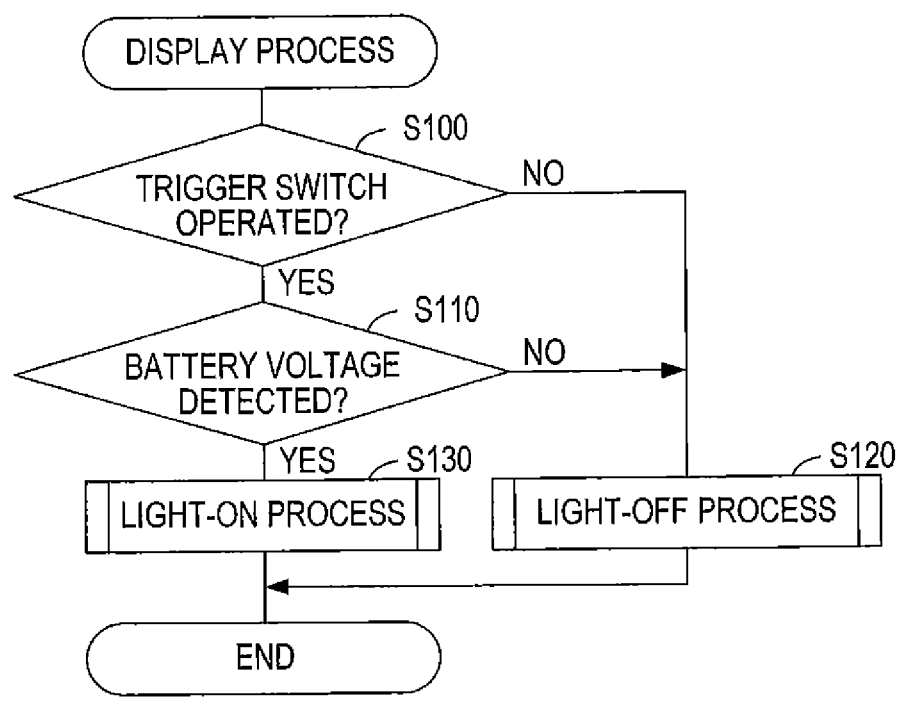
FIG. 4 is a flowchart showing a flow of a display process in the main routine of the first embodiment.

The above described display process (S50) is executed as shown in FIG. 4.

As shown in FIG. 4, in the display process, it is first determined whether the trigger switch 61 is operated based on the operation detection flag (S100). If it is determined that the trigger switch 61 is not operated (S100: NO), the process immediately proceeds to S120 which is to be described later.

If it is determined that the trigger switch 61 is operated (S100: YES), it is determined whether the battery voltage is detected based on the value of the battery voltage obtained in the AD conversion process described above (S110). Specifically, when the trigger switch 61 is actually operated and the switch S1 is turned on, a voltage value corresponding to the battery voltage is detected. When the trigger switch 61 is not actually operated and the switch S1 is turned off, a voltage value different from the battery voltage is detected.

If it is determined that the battery voltage is not detected (S110: NO), a light-off process is executed (S120) and the display process is terminated. In the light-off process, a light-off command to turn off the light source 27 is output to the lighting control unit 20 to turn off the light source 27.

If it is determined that the battery voltage is detected (S110: YES), a light-on process is executed (S130) and the display process is terminated. In the light-on process, a light-on command to turn on the light source 27 is output to the lighting control unit 20 to turn on the light source 27.

In the appliance 1 configured as described above, whether the trigger switch 61 is actually operated is determined based on not only the operation detection signal but also the battery voltage detection signal. Thus, whether the trigger switch 61 is actually operated can be more accurately determined. Therefore, the appliance 1 can suppress erroneous recognition that the appliance 1 is operated, and thus can suppress unnecessary lighting of the light source 27.

In the first embodiment, the light source 27 corresponds to an example of a light source in the present disclosure, the lighting control unit 20 corresponds to an example of a lighting unit of the present disclosure, the motor M1 corresponds to an example of a motor in the present disclosure, and the trigger switch 61 corresponds to an example of an operation unit of the present disclosure.

Also, in the first embodiment, the switch S2 and the trigger switch detector 19 correspond to an example of an operation detector in the present disclosure, the battery voltage detector 14 corresponds to an example of a reference signal output unit in the present disclosure, the MCU 11 executing S100 and S110 in the display process corresponds to an example of a determination unit in the present disclosure, and the MCU 11 executing S120 and S130 in the display process corresponds to an example of a control unit of the present disclosure.

In the first embodiment, the battery 41 corresponds to an example of a power source in the present disclosure, the switch S1 corresponds to an example of a switch in the present disclosure, the dummy substrate 26 corresponds to an example of a substrate in the present disclosure, and the plurality of terminals 62 correspond to an example of at least one first terminal and at least two second terminals of the present disclosure.

Second Embodiment

Hereinafter, a second embodiment of the present disclosure will be described. The second embodiment is the same as the first embodiment except for the display process. Thus, here, only the display process will be described, and the description other than the display process will not be repeated.

Figure 5:
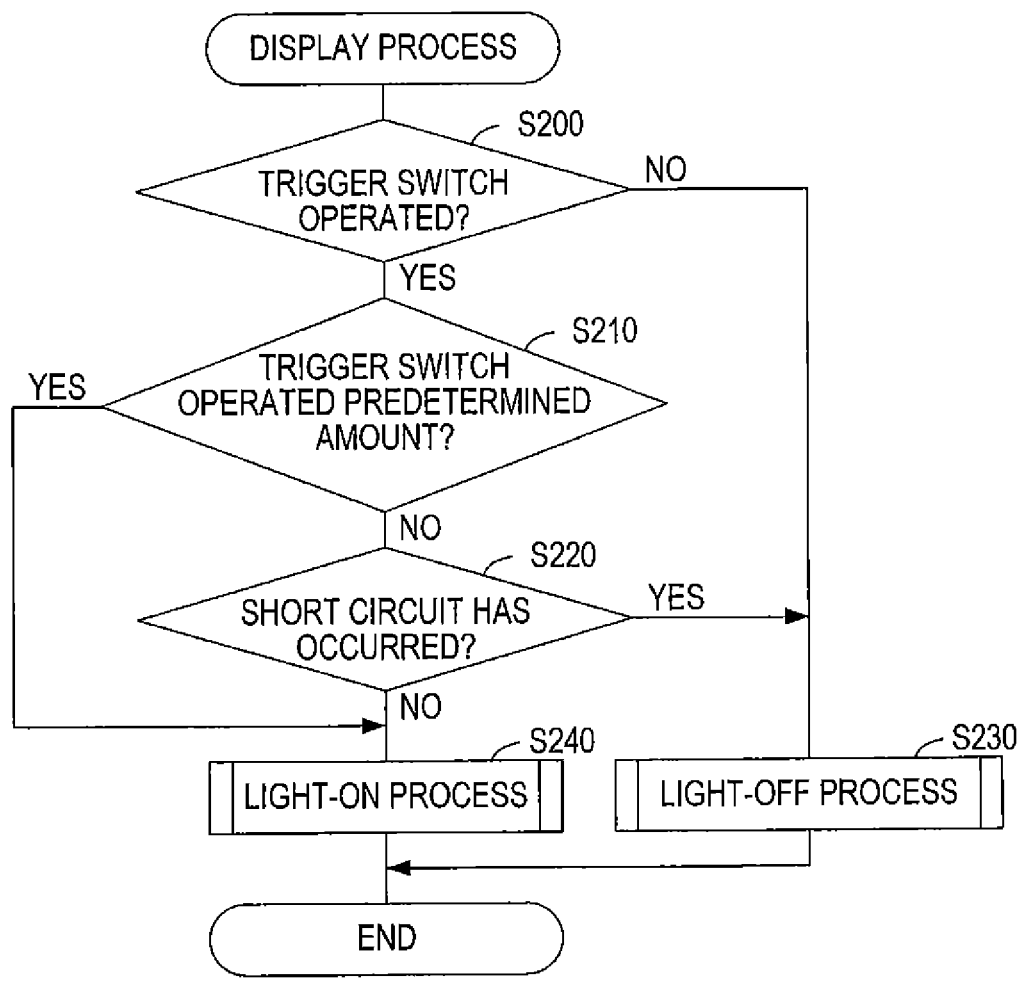
FIG. 5 is a flowchart showing a flow of a display process of a second embodiment.

As shown in FIG. 5, in the display process of the second embodiment, it is first determined whether the trigger switch 61 is operated based on the operation detection flag (S200). If it is determined that the trigger switch 61 is not operated (S200: NO), the process immediately proceeds to S230 described below.

If it is determined that the trigger switch 61 is operated (S200: YES), it is then determined whether the trigger switch 61 is operated a predetermined amount (S210). More specifically, on the basis of the voltage value input from the movable terminal of the variable resistor VR1 obtained in the AD conversion process (S30) in the main routine, it is determined whether the trigger switch 61 is operated a predetermined amount.

If it is determined that the trigger switch 61 is operated a predetermined amount (S210: YES), the process immediately proceeds to S240 described below. If it is determined that the trigger switch 61 is not operated a predetermined amount (S210: NO), it is then determined whether a short circuit has occurred in the connector CN1 or the dummy substrate 26 on the basis of the voltage value of the first short-circuit detection signal and the voltage value of the second short-circuit detection signal (S220).

If it is determined that a short circuit has occurred in the connector CN1 or the dummy substrate 26 (S220: YES), the same light-off process as in S120 in the first embodiment is executed (S230), and the display process is terminated.

If it is determined that a short circuit has not occurred in both of the connector CN1 and the dummy substrate 26 (S220: NO), the same light-on process as in S130 in the first embodiment is executed (S240), and the display process is terminated.

In the appliance 1 of the second embodiment thus constructed, whether the trigger switch 61 is actually operated is determined based on not only the operation detection signal but also the first short-circuit detection signal and the second short-circuit detection signal. Thus, like the appliance 1 of the first embodiment, whether the trigger switch 61 is actually operated can be determined more accurately. Accordingly, the appliance 1 of the second embodiment, like the appliance 1 of the first embodiment, can suppress erroneous recognition that the appliance 1 is operated, and thus can suppress unnecessary lighting of the light source 27.

In the second embodiment, the connector abnormality detector 17 and the substrate abnormality detector 18 correspond to an example of the reference signal output unit in the present disclosure, the MCU 11 that executes S200 and S220 of the display process corresponds to an example of the determination unit in the present disclosure, and the MCU 11 that executes S230 and S240 of the display process corresponds to an example of the control unit of the present disclosure.

Third Embodiment

Hereinafter, a third embodiment of the present disclosure will be explained. Here, the same components as in the first embodiment will be denoted by the same reference numerals as in the first embodiment and the description thereof will not be repeated. The description of the third embodiment will be given with a focus on different parts.

As shown in FIG. 6, an appliance 30 of the third embodiment is configured as an electric circular saw. The appliance 30 is provided with a grip portion 31 for a user of the appliance 30 to grip the appliance 30. This grip portion 31 is provided with a switch section 32 for the user to manipulate in order to operate the motor M1 of the appliance 30. Behind the grip portion 31, the battery pack 4 is detachably attached.

FIG. 7 is an enlarged sectional view of the switch section 32 when viewed from the left side of FIG. 6.

As shown in FIG. 7, the switch section 32 is provided with a switch lever 33. The switch lever 33 is provided to the switch section 32 to allow the user to pull the switch lever 33.

The switch section 32 further comprises a switch unit 34. The switch unit 34 is disposed adjacent to the switch lever 33. The switch unit 34 comprises an activation switch 35 that is configured to be pushed into the switch unit 34 when the switch lever 33 is pulled and is in contact with the activation switch 35.

The switch unit 34 further comprises a light electric connector CN2. The light electric connector CN2 is connected to a controller 100 shown in FIG. 9 through at least one pair of not shown wires.

The switch unit 34 further comprises a pair of strong electric connectors CN3, CN4. The strong electric connector CN3 is connected to the positive electrode of the battery 41 via a not shown single wire, while the strong electric connector CN4 is connected to the controller 100 shown in FIG. 9, and thus to the motor M1, through another not shown wire.

More specifically, as shown in FIG. 8A, the switch unit 34 is provided with a pair of light electric contacts 36, 37. Each of the pair of light electric contacts 36, 37 is connected to a corresponding terminal in the above described light electric connector CN2.

The switch unit 34 further comprises a pair of strong electric contacts 39, 40. The strong electric contact 39 is provided with a contact piece 42 to electrically connect the strong electric contact 39 and the strong electric contact 40. The strong electric contact 39 is connected to the strong electric connector CN3, while the strong electric contact 40 is connected to the strong electric connector CN4.

The activation switch 35 is provided with a contact piece 38 in a region facing the light electric contacts 36, 37 of the activation switch 35. The activation switch 35 is further provided with a protrusion 351 that protrudes toward the contact piece 42 in a region facing the contact piece 42.

Here, an interval between the strong electric contact 39 and the strong electric contact 40 (more specifically, the contact piece 42) is set larger than an interval between the light electric contact 36 and the light electric contact 37 (more specifically, the contact piece 38).

In the switch unit 34 thus configured, as shown in FIG. 8B, when the activation switch 35 is pushed into the switch unit 34, the light electric contacts 36 and 37 are electrically connected via the contact piece 38 and the strong electric contacts 39, 40 are electrically connected via the contact piece 42 pressed by the protrusion 351.

As shown in FIG. 9, the controller 100 of the appliance 30 is different from the controller 10 of the first embodiment in that the controller 100 comprises a first contact voltage detector 51, a second contact voltage detector 52, a strong electric connection detector 53, and a light electric connection detector 54 instead of the battery voltage detector 14, the changeover switch detector 16, the connector abnormality detector 17, the substrate abnormality detector 18, and the trigger switch detector 19.

Also, the appliance 30 is different from the appliance 1 of the first embodiment in that the appliance 30 comprises the switch unit 34 instead of the switch section 6, and that the dummy substrate 26 is eliminated.

In the switch unit 34, while the strong electric contact 39 is connected to the positive electrode of the battery 41, the strong electric contact 40 is connected to the motor M1 through the driver circuit 22. While the light electric contact 36 is connected to the negative electrode of the battery 41, the light electric contact 37 is connected to the light electric connection detector 54.

The first contact voltage detector 51 is configured to detect a value of the voltage of the strong electric contact 39 and output to the MCU 11 a first contact voltage signal that indicates the detected value of the voltage.

The second contact voltage detector 52 is configured to detect a value of the voltage of the strong electric contact 40 and output to the MCU 11 a second contact voltage signal that indicates the detected value of the voltage.

The strong electric connection detector 53 is connected to the strong electric contact 40. The strong electric connection detector 53 is configured to output to the MCU 11 a strong electric connection detection signal that indicates that the strong electric contact 39 and the strong electric contact 40 are electrically connected when the value of the voltage of the strong electric contact 40 matches the voltage of the positive electrode of the battery 41.

The light electric connection detector 54 is connected to the light electric contact 37 as described above. The light electric connection detector 54 is configured to output to the MCU 11 a light electric connection detection signal that indicates that the light electric contact 36 and the light electric contact 37 are electrically connected when the value of the voltage of the light electric contact 37 matches the voltage of the negative electrode of the battery 41.

In the main routine executed by the MCU 11 in the controller 100 configured as described above, it is determined whether the strong electric connection detection signal is input from the strong electric connection detector 53 in the operation detection process (S20) of FIG. 3. If the strong electric connection detection signal is input, a strong electric connection detection flag is set that indicates that the strong electric contact 39 and the strong electric contact 40 are connected. In the case where the strong electric connection detection signal is not input, the strong electric connection detection flag is reset. In the operation detection process, it is further determined whether the light electric connection detection signal is input from the light electric connection detector 54. When the light electric connection detection signal is input, a light electric connection detection flag is set that indicates that the light electric contact 36 and the light electric contact 37 are connected. When the light electric connection detection signal is not input, the light electric connection detection flag is reset.

In the AD conversion process (S30) of FIG. 3, the value of the voltage of the strong electric contact 39 indicated by the first contact voltage signal, the value of the voltage of the strong electric contact 40 indicated by the second contact voltage signal, the value of the temperature indicated by the temperature detection signal, the value of the current indicated by the current detection signal are converted into digital values and stored in the memory of the MCU 11.

The motor control process (S40) in the third embodiment is executed as shown in FIG. 10.

As shown in FIG. 10, in the motor control process, it is first determined whether the strong electric connection detection flag is set, thereby to determine whether the strong electric contact 39 and the strong electric contact 40 are connected (S300). If the strong electric connection detection flag is reset (S300: NO), the motor control process immediately ends.

When the strong electric connection detection flag is set (S300: YES), it is determined whether the light electric connection detection flag is set, thereby to determine whether the light electric contact 36 and the light electric contact 37 are connected (S310). If the light electric connection detection flag is set (S310: YES), a predetermined motor driving process is executed (S320), and the motor control process is terminated. In the motor driving process, the MCU 11 sets a motor drive flag indicating that the motor is being driven. Furthermore, the MCU 11 outputs to the gate circuit 23 a drive command that drives the motor M1 at a predetermined rotational speed in order for the user to work with the electric circular saw, thereby to drive the motor M1.

When the light electric connection detection flag is reset (S310: NO), it is determined whether the motor drive flag is set, thereby to determine whether the motor M1 is being driven (S330). If the motor M1 is being driven (S330: YES), a predetermined motor stop process is executed (S340), and the motor control process is terminated. In the motor stop process, the MCU 11 outputs to the gate circuit 23 a disconnection command to electrically disconnect the motor M1 from the battery 41, or a braking command to make the motor M1 generate regenerative braking, thereby to stop the motor M1.

When the motor M1 is stopped (S330: NO), a predetermined conduction process is executed (S350), and the motor control process is terminated. In the conduction process, a conduction flag to indicate that the motor M1 is conducted is set. Then, a conduction command to flow a predetermined magnitude of current to the motor M1 is output to the gate circuit 23 to flow the current to the motor M1. In addition, in the third embodiment, the conduction command to flow a small current to the extent that it is not possible to drive the motor M1, or a small current enough to rotate the motor M1 so that the motor M1 is rotated at a very slow rotational speed, is output to the gate circuit 23, thereby to flow a small current to the motor M1.

The display process (S50) of the third embodiment is executed as shown in FIG. 11.

As shown in FIG. 11, in the display process, it is first determined whether the strong electric connection detection flag is set (S400). When the strong electric connection detection flag is reset (S400: NO), the display process immediately ends.

On the other hand, if the strong electric connection detection flag is set (S400: YES), it is determined whether a difference between the value of the voltage of the strong electric contact 39 indicated by the first contact voltage signal and the value of the voltage of the strong electric contact 40 indicated by the second contact voltage signal, that is, an electric potential difference between the strong electric contact 39 and the strong electric contact 40, is less than a predetermined voltage threshold (S410). In the third embodiment, a voltage value larger than the electric potential difference between the strong electric contact 39 and strong electric contact 40 when the strong electric contacts 39 and the strong electric contact 40 are electrically connected is set to the above described voltage threshold.

If the electric potential difference between the strong electric contact 39 and the strong electric contact 40 is less than the voltage threshold (S410: YES), the process immediately proceeds to S440 described below.

If the electric potential difference between the strong electric contact 39 and the strong electric contact 40 is equal to or higher than the voltage threshold (S410: NO), it is determined whether or not the conduction flag is set, thereby to determine whether or not the motor M1 is being conducted with a small current (S420). If the motor M1 is not being conducted (S420: NO), the display process immediately ends.

When the motor M1 is being conducted (S420: YES), it is determined whether or not a value of the current indicated by the current detection signal is greater than a predetermined current threshold (S430). In the third embodiment, the value of the current that may flow in the motor M1 when the strong electric contact 39 and the strong electric contact 40 are electrically disconnected is set to the current threshold.

If the value of the current indicated by the current detection signal is greater than the current threshold (S430: YES), the same light-on process as the light-on process in the first embodiment (S130) is executed (S440), and the display process ends.

On the other hand, when the value of the current indicated by the current detection signal is equal to or smaller than the current threshold (S430: NO), the same light-off process as the light-off process in the first embodiment (S120) is executed (S450), and the display process ends.

In the appliance 30 of the third embodiment constructed as described above, as compared to the interval between the light electric contact 36 and light electric contact 37, the interval between the strong electric contact 39 and the strong electric contact 40 is large. Thus, the strong electric contact 39 and the strong electric contact 40 are hardly short circuited by moisture or dust. However, based on the current and the electric potential difference related to an impedance between the strong electric contact 39 and the strong electric contact 40, erroneous recognition that the appliance 30 is operated can be suppressed, and thus unnecessary lighting of the light source 27 can be suppressed.

Also, by flowing to the motor M1 a minimum current required to confirm whether the switch lever 33 is actually operated and the strong electric contact 39 and the strong electric contact 40 are connected, it is possible to reduce or eliminate a possibility of danger such as unnecessarily rotating the motor M1.

In the third embodiment, the first contact voltage detector 51, the second contact voltage detector 52 and the current detection circuit 24 correspond to an example of the reference signal output unit in the present disclosure, the strong electric contact 39 corresponds to an example of a first contact in the present disclosure, and the strong electric contact 40 corresponds to an example of a second contact in the present disclosure.

In the third embodiment, the driver circuit 22 corresponds to an example of a switching unit of the present disclosure, and the MCU 11 executing S350 of the motor control process and the gate circuit 23 correspond to an example of the drive unit of the present disclosure.

The exemplary embodiment of the present disclosure has been described above. However, the present disclosure is not at all limited to the above first, second and third embodiments, and can be implemented in various aspects without departing from the scope of the present disclosure.

For example, in the above-described first, second, and third embodiments, the present disclosure is applied to a motor driven appliance constructed as a driver drill or an electric circular saw. However, the present disclosure may be applied to an electric power tools other than driver drills and electric circular saws, or a motor driven appliance configured as an electric working machine such as an electric brush cutter.

Also, in the above described first embodiment, it is determined whether the battery voltage has been detected in S110 of the display process thereby to determine whether the trigger switch 61 is actually operated. In the second embodiment, it is determined whether a short circuit has occurred in S220 of the display process thereby to determine whether the trigger switch 61 is actually operated. In a variant, S110 of the display process in the first embodiment and S220 in the second embodiment may be combined. More specifically, for example, in the display process of the second embodiment, S110 of the display process in the first embodiment may be executed before the process of S210.

Also, in the above described first, second, and third embodiments, the present disclosure is applied to lighting of the light source 27 of the lighting unit 7. However, for example, the present disclosure may be applied to lighting of other light sources such as a light source for the remaining power display 21.

In the above first, second, and third embodiments, the MCU 11 is configured as a microcomputer. The MCU 11 may be constructed by combining individual electronic parts, may be an ASIC (Application Specified Integrated Circuit), a programmable logic device such as, for example, a FPGA (Field Programmable Gate Array), or a combination thereof.

In the above first, second, and third embodiments, the motor M1 is a three-phase brushless DC motor. The motor M1 may take other forms, such as, for example, a brushed DC motor, an alternating current (AC) motor, a stepping motor, or a linear motor.

Also, in the third embodiment, the switch unit 34 is constructed to integrally include the strong electric contacts 39 and 40 and the light electric contacts 36 and 37. The light electric contacts 36 and 37 may be provided separately from the strong electric contacts 39 and 40.

In addition, the first, second, and third embodiments may be combined as appropriate.

Also, in the third embodiment, in S410 in FIG. 11, when the electric potential difference between the strong electric contact 39 and the strong electric contact 40 is the predetermined voltage threshold or above (S410: NO), the determination process based on the current value is executed in S430. However, when it is determined that the strong electric connection detection flag is set in S400 (S400: YES), the determination process of S410 may be omitted, and the process may proceed to S420.

What is claimed is:

1. A motor driven appliance comprising:
a light source;
a lighting unit configured to turn on the light source;
a motor configured to generate a driving force for work to be done by a user of the motor driven appliance;
a power source configured to supply to the motor an electric power to drive the motor;
an operation unit configured to be operated by the user to actuate the motor;
an operation detector configured to detect that the operation unit is operated, and to output an operation detection signal that indicates that the operation unit is operated;
a reference signal output unit configured to output at least one reference signal that can be used as a reference for determining whether the detection by the operation detector is normal;
a determination unit configured to determine whether the operation unit is actually operated based on the operation detection signal and the at least one reference signal; and
a control unit configured to control operation of the lighting unit based on the determination made by the determination unit,
wherein the operation unit comprises a switch configured to electrically connect and disconnect the motor and the power source, and
the reference signal output unit is further configured to output as the at least one reference signal a signal that indicates whether the motor and the power source are electrically connected via the switch.

2. The motor driven appliance according to claim 1, wherein the control unit is further configured to stop the operation of the lighting unit when the determination unit determines that the operation unit is not actually operated, while to activate the lighting unit when the determination unit determines that the operation unit is actually operated.

3. The motor driven appliance according to claim 1, further comprising a substrate without waterproof and dust-proof coating,
wherein the reference signal output unit is further configured to output as the at least one reference signal a signal that indicates whether a short circuit is occurring in the substrate.

4. The motor driven appliance according to claim 1, wherein the operation detector comprises at least one first terminal for outputting the operation detection signal, and at least two second terminals distinct from the at least one first terminal,
wherein the reference signal output unit is further configured to output as the at least one reference signal a signal that indicates whether a short circuit is occurring between the at least two second terminals.

5. The motor driven appliance according to claim 1, wherein the operation unit comprises a first contact connected to the power source configured to supply to the motor an electric power to drive the motor, and a second contact connected to the motor, the operation unit being configured to electrically connect the first contact and the second contact to one another when the operation unit is operated, and the reference signal output unit is further configured to output as the at least one reference signal at least one signal that indicates at least one kind of physical quantity related to an impedance between the first contact and the second contact.

6. The motor driven appliance according to claim 5, wherein the determination unit is further configured to determine that the operation unit is not actually operated when it is indicated by the at least one signal that indicates the at least one kind of physical quantity that the impedance between the first contact and the second contact is greater than a predetermined specified impedance.

7. The motor driven appliance according to claim 5, wherein the at least one kind of physical quantity comprises an electric potential difference between the first contact and the second contact.

8. The motor driven appliance according to claim 5, wherein the at least one kind of physical quantity comprises a magnitude of a current flowing through the motor.

9. The motor driven appliance according to claim 8, further comprising:
a switching unit configured to electrically connect and disconnect the second contact and the motor; and
a driving unit configured to drive the switching unit so as to electrically connect the second contact and the motor, the driving unit being configured to drive the switching unit to flow a current of a predetermined magnitude to the motor to confirm whether the operation unit is actually operated.

10. A motor driven appliance comprising:
a light source;
a lighting unit configured to turn on the light source;
a motor configured to generate a driving force for work to be done by a user of the motor driven appliance;
an operation unit configured to be operated by the user to actuate the motor;
an operation detector configured to detect that the operation unit is operated, and to output an operation detection signal that indicates that the operation unit is operated;
a reference signal output unit configured to output at least one reference signal that can be used as a reference for determining whether the detection by the operation detector is normal;
a determination unit configured to determine whether the operation unit is actually operated based on the operation detection signal and the at least one reference signal; and
a control unit configured to control operation of the lighting unit based on the determination made by the determination unit,
wherein the operation detector comprises at least one first terminal for outputting the operation detection signal, and at least two second terminals distinct from the at least one first terminal,
wherein the reference signal output unit is further configured to output as the at least one reference signal a signal that indicates whether a short circuit is occurring between the at least two second terminals.

11. A motor driven appliance comprising:
a light source;
a lighting unit configured to turn on the light source;
a motor configured to generate a driving force for work to be done by a user of the motor driven appliance;

an operation unit configured to be operated by the user to actuate the motor;

an operation detector configured to detect that the operation unit is operated, and to output an operation detection signal that indicates that the operation unit is operated;

a reference signal output unit configured to output at least one reference signal that can be used as a reference for determining whether the detection by the operation detector is normal;

a determination unit configured to determine whether the operation unit is actually operated based on the operation detection signal and the at least one reference signal; and a control unit configured to control operation of the lighting unit based on the determination made by the determination unit, wherein the operation unit comprises a first contact connected to the power source configured to supply to the motor an electric power to drive the motor, and a second contact connected to the motor, the operation unit being configured to electrically connect the first contact and the second contact to one another when the operation unit is operated, and the reference signal output unit is further configured to output as the at least one reference signal at least one signal that indicates at least one kind of physical quantity related to an impedance between the first contact and the second contact.

* * * * *